United States Patent [19]

Lai et al.

[11] Patent Number: 4,657,964

[45] Date of Patent: Apr. 14, 1987

[54] AQUEOUS-BASED URETHANE COATING COMPOSITIONS

[75] Inventors: Kwo-Hrong Lai, Lynnfield; Milton Lapkin, Sudbury; Frank B. Swasey, Salem, all of Mass.

[73] Assignee: ICI Americas Inc., Wilmington, Del.

[21] Appl. No.: 752,150

[22] Filed: Jul. 3, 1985

[51] Int. Cl.$^4$ .................. C08L 75/12; C08K 3/22; C08G 18/50; C08G 18/32
[52] U.S. Cl. .................. 524/409; 524/591; 524/840
[58] Field of Search .................. 524/591, 840, 409

[56] References Cited

U.S. PATENT DOCUMENTS

| | | | |
|---|---|---|---|
| 4,108,814 | 8/1978 | Reiff | 524/840 |
| 4,238,378 | 12/1980 | Markusch et al. | 260/29.2 |
| 4,303,774 | 12/1981 | Nachtkamp et al. | 528/71 |
| 4,452,834 | 6/1984 | Nachtkamp et al. | 427/379 |
| 4,452,923 | 6/1984 | Carroll et al. | 521/167 |
| 4,501,852 | 2/1985 | Markusch et al. | 524/591 |
| 4,507,431 | 3/1985 | Stutz | 524/840 |
| 4,554,308 | 11/1985 | Russiello | 524/840 |

*Primary Examiner*—C. Warren Ivy
*Attorney, Agent, or Firm*—John Wilson Jones; John M. Sheehan

[57] ABSTRACT

Aqueous urethanes having improved physical properties in addition to excellent flame retardant properties are obtained when a combination of a halogenated diol, such as an alkoxylated tetrabromobisphenol A, or dibromoneopentyl glycol and a second diol which contains either a carboxy group, a sulphonate group or a tertiary amine group is incorporated in the urethane.

12 Claims, No Drawings

AQUEOUS-BASED URETHANE COATING COMPOSITIONS

BACKGROUND OF THE INVENTION

1. Field of the Invention

The present invention relates generally to aqueous-based, urethane-containing, coating compositions having a combination of flame retardant and desirable physical properties, to urethane prepolymers suitable for use in such compositions, to a method of preparing such compositions and to the use of such compositions to impart desirable physical properties to coated substrates. More particularly, the invention relates to aqueous based urethane coating compositions wherein the urethane component comprises the reaction product of (a) a prepolymer of a halogenated diol, a second diol which is either a carboxy group, a sulphonate group or a tertiary amine containing diol, a polyol and an organic diisocyanate and (b) an active hydrogen containing chain extender.

2. Description of the Prior Art

Aqueous-based, urethane-containing, coating compositions have been described in the literature. See, for example, U.S. Pat. Nos. 3,870,684; 4,066,591; 4,108,814 and 4,335,029. However, for a variety of applications, the physical properties, including the fire retardancy, of coatings prepared from these compositions has been less than satisfactory. The use of additives to impart fire-retardant properties to polyurethanes is commonly practiced in the industry. See, for example, U.S. Pat. No. 3,956,233. These additives include phosphorus or halogen containing compounds and antimony oxide. These various external additives are relatively low molecular weight materials which readily migrate from the resin matrix. Especially where used in thin film coating applications, these additives are readily removed during washing or dry cleaning which reduces the fire-retardancy and alters the properties of the coated product.

It is also known that the incorporation of halogens and/or phosphorus into polymeric organic compounds will improve the fire-retardancy of the polymers, and this concept has been followed in the development of fire-retardant paints and coatings. See, for example, U.S. Pat. Nos. 3,681,281 and 3,794,617.

Finally, the use of reactive intermediates to impart fire-retardant properties to polyurethanes is also known in the art. These intermediates are organic phosphorus compounds and halogenated compounds containing active hydrogens which enable them to react with organic isocyanates or isocyanate terminated prepolymers to form polyurethanes. See, in this regard, U.S. Pat. Nos. 3,639,295 and 3,778,408 which disclose organic-solvent based flame-retardant polyurethane coating compositions containing the reaction product of a halogen containing polyol, a phosphorus containing polyol and an organic isocyanate.

SUMMARY OF THE INVENTION

In accordance with the present invention aqueous based, urethane-containing, coating compositions suitable for use in imparting a combination of flame-retardancy and improved physical properties such as increased tensile strength and color stability to a coated substrate are prepared by incorporating into a urethane polymer a halogenated diol and a second diol selected from the group consisting of carboxy group and sulphonate group containing diols and tertiary amine containing diols.

DESCRIPTION OF THE PREFERRED EMBODIMENT

As indicated above, the improved coating compositions of the present invention are based upon a urethane prepolymer comprising the reaction product of
- a halogenated diol selected from the group consisting of alkoxylated halogenated Bisphenol A diols and halogenated neopentyl glycols,
- a second diol selected from the group consisting of carboxy group or sulphonate group containing diols and tertiary amine containing diols,
- a polyol, and
- an organic diisocyanate.

Each of these components is described separately below. As is also described below, these prepolymers are reacted with an active hydrogen containing chain extender to prepare the urethane polymer used in the coating compositions of this invention.

Halogenated diol

As noted above, the halogenated diols useful in this invention include Bisphenol A diols and neopentyl glycols.

The Bisphenol A diols useful in this invention have the formula

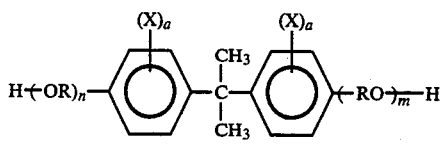

wherein X is bromine or chlorine, preferably bromine; a is an integer from 1 to 4; R is a bivalent hydrocarbon radical containing from 2 to 6 carbon atoms such as ethylene, propylene, butylene, etc. and n and m are integers from 1 to 10 preferably from 1 to 3. Typical examples of brominated diols having this formula include:

polyoxypropylene(2.4) 2,2-bis(4-hydroxy-3,5-dibromophenyl)propane;

polyoxypropylene(2.4) 2,2-bis(2,3,5,6-tetrabromo-4-hydroxyphenyl)propane;

polyoxypropylene(2) 2,2-bis(2,3,5,6-tetrabromo-4-hydroxyphenyl)propane;

polyoxyethylene(2.2) 2,2-bis(4-hydroxy-dibromo-phenyl)propane;

polyoxyethylene(8) 2,2-bis(2,3-dichloro-4-hydroxyphenyl)propane;

polyoxybutylene(2.1) 2,2-bis(2,3-dichloro-5,6-dibromo-4-hydroxyphenyl)propane; and polyoxyethylene(2) 2,2-bis(2-chloro-4-hydroxyphenyl)propane.

Polyoxyethylene(2) 2,2-bis(3,5-dibromo-4-hydroxyphenyl)propane has been found to be especially useful in the urethanes of the present invention.

The neopentyl glycols which may be used have the formula

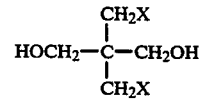

wherein X is bromine or chlorine, preferably bromine. Dibromo neopentyl glycol has been found to be especially useful in the urethanes of the present invention.

The polyurethane preferably contains from about 1 to about 30% by weight of the halogenated diol.

Second Diol

In addition to the halogenated Bisphenol A diol, the urethanes of the present invention also include a second substance selected from the group consisting of carboxy group, sulphonate group and tertiary amine containing polyols containing two or more active hydrogen substituents, preferably a hydroxyl, or primary or secondary amine function.

Carboxy group containing diols which may be used have the following general formula:

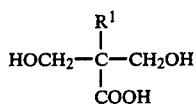

wherein $R^1$ is hydrogen or a straight or branched chain alkyl group containing from 1 to 8 carbon atoms and including, for example, methyl, ethyl, propyl, butyl, pentyl, hexyl, heptyl and octyl. The preferred carboxy group containing diol is 2,2-dimethylol propionic acid. As explained below, when such a diol is utilized, the acidic carboxy group must be neutralized to form an ionic group prior to preparation of the coating dispersion. This can be done either before, during or after preparation of the prepolymer alternatively, the carboxy groups containing diol can be incorporated into a polyester polyol prior to preparation of the urethane prepolymer.

Sulphonate group containing diols which may be used include those which have previously been used in the preparation of aqueous urethane dispersions including, for example, those described in U.S. Pat. No. 4,108,814, the disclosure of which is incorporated herein by reference. As described in that patent these diols may be represented by the following formula:

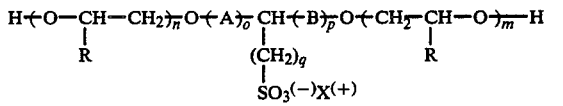

wherein
A and B which may be the same or different, each represents a divalent aliphatic hydrocarbon group containing from 1 to 6 carbon atoms;
R represents hydrogen, an aliphatic hydrocarbon group containing from 1 to 4 carbon atoms or a phenyl group;
$X^{(+)}$ represents an alkali metal cation or an ammonium group which may be substituted;
n and m which may be the same or different, and represents an integer of from 0 to 30;
o and p represent 0 or 1; and
q represents an integer of from 0 to 2.

Tertiary amine containing diols which may be used include
N-methyl diethanolamine
N-butyl diethanolamine
N-oleyl diethanolamine
N-cyclohexyl diethanolamine
N-methyl diisopropanolamine
N-cyclohexyl diisopropanolamine
N,N-dioxaethylaniline
N,N-dioxaethyl-m-toluidine
N,N-dioxaethyl-p-toluidine
N,N-dioxypropyl-naphthylamine
dioxaethylpiperazine
polyethers with tertiary amino groups or polyesters with tertiary amino groups formed by incorporating a tertiary amine containing diol into the polyether or polyester. A preferred tertiary amine containing diol is N-methyldiethanolamine.

The polyurethane preferably contains from about 1% to about 12% by weight of the second diol.

Polyol

The polyols useful in this invention have a hydroxy functionality equal to at least 2, and are selected from the group consisting of (a) polyesters, polylactones, polyacetals, polycarbonates, polyolefins, polyethers, polythioethers and mixture or combined polymers thereof having a molecular weight of from about 300 to about 4200, (b) linear or branched hydrocarbons containing from 2-20 carbon atoms having molecular weight up to 300 and (c) combinations of (a) and (b).

These polyols are known to those skilled in the art of urethane chemistry. Suitable polyesters with hydroxyl groups include, e.g., reaction product of polyhydric, preferably dihydric alcohols with the optional inclusion of trihydric alcohols, with polybasic, preferably dibasic, carboxylic acids. Instead of free polycarboxylic acids, the corresponding polycarboxylic acid anhydrides or esters of lower alcohols or mixtures thereof may be used for producing the polyesters. The polycarboxylic acids may be aliphatic, cycloaliphatic, aromatic and/or heterocyclic and may be substituted, e.g., with halogen atoms, and/or unsaturated. The following are examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally mixed with monomeric fatty acids, dimethylterephthalate and bis-glycol terephthalate. Suitable polyhydric alcohols include, e.g., ethylene glycol, propylene-1,2- and -1,3-glycol, butylene-1,4- and -2,3-glycol, hexane-1,6-diol, octane-1,8-diol, nonane-1,9-diol, decane-1,10-diol, neopentylglycol, cyclohexanedimethanol(1,4-bis-hydroxymethylcyclohexane), 2-methyl-propane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethyleneglycol, tetraethyleneglycol, polyethyleneglycols, dipropylene glycol, polypropyleneglycols, dibutyleneglycol and polybutylene glycols. The polyesters may contain a proportion of carboxyl end-groups.

The polyethers with preferably 2 hydroxyl groups which may also be used according to the invention are known and may be obtained, e.g., by the polymerization of epoxides, such as ethylene oxide, propylene oxide, butylene oxide, tetrahydrofuran, styrene oxide or epichlorohydrin, either each on its own, e.g., in the presence of $BF_3$, or by an addition of these epoxides, optionally as mixtures of successively, to starting components which contain reactive hydrogen atoms, such as alcohols or amines, e.g., water, ethylene glycol, porpylene-1,3- or 1,2-glycol, 4,4'-dihydroxy-diphenylpropane or aniline.

Polyethers which are modified with vinyl polymers, e.g., the polyethers which may be obtained by polymerizing styrene or acrylonitrile in the presence of polyethers (U.S. Pat. Nos. 3,383,351; 3,304,273; 3,523,093 and 3,110,695 and German Pat. No. 1,152,536) are also suitable. The higher functional polyethers of which a certain proportion may be included are obtained in analogous manner by known methods of alkoxylation of higher functional starter molecules, e.g., ammonia, ethanolamine, ethylenediamine or sucrose.

Suitable polythioethers include, in particular, the condensation products obtained by condensing thiodiglycol either on its own and/or with other glycols, dicarboxylic acids, formaldehyde, aminocarboxylic acids or aminoalcohols. The products obtained are polythio mixed ethers, polythio ether esters or polythioether ester amides, depending on the co-components.

Suitable polyacetals include, e.g., the compounds which may be prepared from glycols, such as diethyleneglycol, triethyleneglycol, 4,4'-dioxethoxy-diphenyldimethylmethane and hexane diol with formaldehyde. Polyacetals suitable for the process according to the invention may also be prepared by polymerizing cyclic acetals.

Suitable polycarbonates are known and may be prepared, e.g., by reacting diols, such as propane-1,3-diol, butane-1,4-diol and/or hexane-1,6-diol, diethylene glycol, triethyleneglycol or tetraethyleneglycol, polyethylene glycol, polypropylene glycol, polytetramethylene glycol, with diarylcarbonates, such as diphenylcarbonate, dialkylcarbonates such as diethyl carbonate, or cyclic carbonates such as ethylene carbonate and propylene carbonate or phosgene.

Suitable polylactones are those known in polyurethane chemistry, such as the polymers of ε-caprolacton and dihydric alcohols, such as Tone polyol ® from Union Carbide.

Suitable polyolefins are those known in polyurethane chemistry such as hydroxy terminated butadiene homo and copolymers, such as Poly bd ® from ARCO.

Finally, the linear or branched hydrocarbons are ethylene glycol, propylene-1,2- and -1,3-glycol, butylene-1,4- and -2,3-glycol, hexane-1,6-diol, octane-1,8-diol, nonane-1,9-diol, decane-1,10-diol, neopentylglycol, cyclohexanedimethanol, 2-methyl-propane-1,3-diol, glycerol, trimethylolpropane, hexane-1,2,6-triol, butane-1,2,4-triol, trimethylolethane, pentaerythritol, mannitol, and sorbitol.

The polyurethane preferably contains from about 20% to about 80% by weight of the polyol.

Diisocyanate

Organic diisocyanates which may be used in the polyurethanes of this invention may be any of the aliphatic or aromatic polyisocyanates ordinarily used to prepare polyurethanes. Illustrative are
2,4-toluene diisocyanate
2,6-toluene diisocyanate
hexamethylene-1,6-diisocyanate
tetramethylene-1,4-diisocyanate
cyclohexane-1,4-diisocyanate
naphthalene-1,5-diisocyanate
diphenylmethane-4,4'-diisocyanate
xylylene diisocyanate
hexahydro xylylene diisocyanate
dicyclohexylmethane-4,4'-diisocyanate
1,4-benzene diisocyanate
3,3'-dimethoxy-4,4'-diphenyl diisocyanate
m-phenylene diisocyanate
isophorone diisocyanate
polymethylene polyphenyl isocyanate
4,4'-biphenylene diisocyanate
4-isocyanatocyclohexyl-4'-isocyanatophenyl methane
p-isocyanatomethyl phenyl isocyanate
1,4-bis-(isocyanatomethyl)cyclohexane
o-tetramethylxylene diisocyanate
p-tetramethylxylene diisocyanate
2,2,4-trimethylhexamethylene diisocyanate
2,4,4-trimethylhexamethylene diisocyanate Mixtures of isocyanates can also be used including blends containing isocyanates with functionalities greater than two such as polymethylene polyphenylisocyanates sold under the brane name "PAPI," such as "PAPI 135" (equivalent weight of 133.5 and average isocyanate functionality of 2.7) and "PAPI 901" (equivalent weight of 133 and average isocyanate functionality of 2.3); aromatic triisocyanate adduct of trimethylol propane and tolylene diisocyanate sold under the brand name "Mondur CB-75"; and aliphatic triisocyanate product of the hydrolytic trimerization of 1,6-hexamethylene diisocyanate, sold under the brand name "Desmodur N".

The amount of isocyanate used should be equal to from about 15% to about 60% by weight of the polyol. The organic diisocyanate is employed in an amount sufficient to react with the hydroxy groups of the diols and polyol so as to produce an NCO terminated prepolymer. The equivalent ratio of organic diisocyanate to hydroxy containing compound should be greater than 1.2 to 1 and is usually in the range of 6 to 1.4:1, preferably within the range of 3 to 1.5:1.

The prepolymers of the present invention are prepared by reacting the halogenated diol, with the organic diisocyanate, polyol, carboxy group, sulphonate group or tertiary amine containing diol to form a water soluble or water dispersible prepolymer. This prepolymer is then emulsified into an aqueous dispersion and followed by chain extension with an active hydrogen containing chain extender, such as water or polyamine.

Preparation of the prepolymer can be carried out by methods well known to those skilled in the art. For example, the diisocyanate is usually first charged to a suitable reactor followed by the halogenated diol, the second diol and the polyol. The mixture is then heated if necessary until the isocyanate has completely reacted with the hydroxy groups to form an NCO-terminated prepolymer being essentially free of hydroxy groups. This is determined by the product having an essentially constant NCO equivalent. Catalysts such as dibutyltine dilaurate, stannous octoate and the like can be employed to accelerate the reaction. The reaction is carried out at from 30° C. to 130° C. depending upon the reactivity of the isocyanate.

A nonreactive solvent or a mixture of solvents is usually employed to facilitate the reaction and to control the viscosity of the prepolymer. Suitable solvent which can be used include acetone, methylethylketone, dimethylformamide, ethylene carbonate, propylene carbonate, N-methylpyrrolidone, ethyl acetate, ethylene glycol acetate, propylene glycol acetate, toluene, or xylene. The preferred solvent for this invention is N- methylpyrrolidone. The quantity of solvent can be from about 0 to 40% depending on the desired prepolymer viscosity. The preferred prepolymer viscosity is less than 20,000 cps measured by a Brookfield viscometer.

The prepolymer is converted into an aqueous dispersion by techniques which are also well known to those skilled in the art. The NCO-containing prepolymer can be dispersed in water by one of two principal methods. Preferably, the prepolymer is added to the water with agitation. Alternatively, the water can be added to the prepolymer with stirring.

As noted above, it is essential that the free carboxyl, sulphonate or amine groups of the second diol be neutralized. This can be done either prior to or simultaneously with the addition of the prepolymer to the water. Thus the neutralizing agent may be added to the prepolymer itself or to the water before the prepolymer is added. The appropriate neutralizing agent depends, of course, on whether the second diol contains carboxy, sulphonate or amine groups. In the case of a carboxy or sulphonate group containing diol, the neutralizing agent may be a tertiary amine such as triethanolamine, triethylamine dimethylethanolamine, N-methyl morpholine or an alkaline hydroxide such as sodium hydroxide or potassium hydroxide. In the case of an amine containing diol, any acidic neutralizing agent having a dissociation constant greater than $1 \times 10^{-5}$ including, for example, acetic acid, formic acid, boric acid, lactic acid, propionic acid, butyric acid, phosphoric acid, sulfuric acid or hydrochloric acid may be utilized. The amount of neutralizing agent should be sufficient to react with all of the free carboxyl sulphonate or amine groups in the prepolymer.

Once the aqueous emulsion is prepared, the prepolymer is reacted with a suitable chain extender to prepare the desired polyurethane coating composition.

The chain extender can be water or any active hydrogen-containing compound having at least two hydrogens more reactive with the NCO groups than water. Examples of suitable classes of chain extenders are primary and secondary organic amines, preferably hydrazine, substituted hydrazines and hydrazine reaction products. The chain extenders are preferably water-soluble, although water-dispersible materials may be used. Water-soluble chain extenders are preferred, because if the prepolymer is only marginally dispersible, a water-soluble chain extender will enhance the water dispersibility of the final polymer product. Organic diamines are often the preferred chain extenders because they usually build the highest molecular weight without gelling the resin.

Examples of suitable well known chain extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, tolylene diamine, xylylene diamine, 3,3'-dinitrobenzidene, 4,4'-methylenebis(2-chloroaniline), 3,3'-dichloro-4,4'-biphenyl diamine. 2.6-Diaminopyridine, 4,4'-diamino diphenylmethane, and adducts of diethylene triamine with acrylate or its hydrolyzed products. Also materials such as hydrazine, substituted hydrazines such as, for example, dimethyl hydrazine, 1,6-hexamethylene-bis-hydrazine, carbodihydrazide, hydrazides or discarboxylic acids and sulfonic acids such as adipic acid mono- or dihydrazide, oxalic acid dihydrazide, isophthalic acid dihydrazide, tartaric acid dihydrazide, 1,3-phenylene disulfonic acid dihydrazide, omega-amino-caproic acid dihydrazide, hydrazides made by reacting lactones with hydrazine such as gamma-hydroxylbutyric hydrazide, bis-semi-carbazide, bishydrazide carbonic esters of glycols such as any of the glycols mentioned above. Also materials containing functional groups such as hydroxyl containing diamine, such as, for example, hydroxyethylethanolamine and salt containing diamine, such as, for example, sodium(2-aminoethyl)-2-aminoethane sulphonate can be used in conjunction with the above mentioned amines to enhance the stability of dispersion. Finally, a mono functional amine can also be used in mixture with the above-mentioned amines to limit the growth of the polymer moleculer weight. Examples of suitable monoamines include butylamine, dibutylamine, ethanolamine, diethanolamine and trimethylolmethylamine.

The chain extension can be conducted at elevated, reduced or ambient temperatures. Convenient temperatures are from about 5° to 95° C. or more, preferably from about 10° to about 45° C. Elevated or reduced pressures may be employed, however, the chain extension reaction is normally conducted at approximately ambient pressure. Generally, it is desired to continue the reaction until a good yield of the desired urethane polymer is obtained. Preferably, the chain extender employed in the method of this invention reacts rapidly with the urethane prepolymer such that undue reaction of water with the isocyanate groups is avoided.

The amount of chain extender employed should be at least sufficient to react with all of the free-NCO groups in the prepolymer. The resulting aqueous dispersions of this invention are advantageously employed as coating compositions, for which purpose they may be further diluted with water and/or organic solvents, or they must be supplied in more concentrated form by evaporation of water and/or organic components of the liquid medium. As coating compositions they may be applied to any substrate including wood, metals, glass, cloth, plastics, foam and the like, by any conventional method including brushing, dipping, flow coating, spraying, and the like. The compositions may contain other conventional ingredients including organic solvents, pigments, dyes, emulsifiers, surfactants, thickeners, heat stabilizers, levelling agents, anti-cratering agents, fillers, sedimentation inhibitors, UV absorbers, antioxidants and the like introduced at any stage of the production process or subsequently. It is possible, but not necessary, to include an amount of an antimony oxide in the dispersions to further enhance the fire retardant properties.

These dispersions may also be used in non-coating applications such as in adhesive, cast thin or thick films, etc.

As noted above it has been found that coatings prepared from the compositions of the present invention have superior consistent fire retardancy combined with high tensile strength. It has also surprisingly been found that textile or fabric saturated with the polyurethane of this invention provides not only flame retardancy but exceptionally good fray resistance and washability without using an external crosslinking agent. When this polyurethane is applied on vinyl as a protective topcoat it surprisingly maintains its color lightfastness.

In order to describe the present invention so that it may be more clearly understood, the following examples are set forth. These examples are set forth primarily for the purpose of illustration, and any specific enumeration of detail contained therein should not be interpreted as a limitation on the concept of this invention.

In evaluating the coatings produced herein, the following standard tests were employed.

The fire retardancy of the coatings was measured in accordance with the AATCC Test Method 34-1969.

Tensile strength was measured in accordance with ASTM D882.

Percent elongation was measured by ASTM D882.

Percent modulus was measured by ASTM D882.

Sward hardness was measured by ASTM D2143.

Heat aging of the coating was measured in accordance with Ford Test Method ESBM8P3A/43.

All components in the compositions are given in parts by weight. In order to more conveniently describe the components utilized in the examples, certain of the components are identified by their trademarks or a representative symbol. The trademarks or symbols used in the examples are identified as follows:

DESMODUR W refers to methylene bis-(4-isocyanatocyclohexane) having a functionality of 2.0 available from Mobay Chemical.

DMPA refers to 2,2-dimethylolpropionic acid.

NMP refers to N-methyl-2-pyrrolidone.

TEA refers to triethylamine.

NYACOL A1530 refers to an antimony pentoxide colloidal dispersion available from Nyacol Inc. and having the following properties:

| | |
|---|---|
| Antimony oxide, weight %: | 30 |
| Approx. particle size, millimicrons: | 15 |
| pH, 25° C.: | 4–6 |
| Density, Pounds per Gallon: | 11.45 |
| Specific Gravity: | 1.37 |
| Stabilizer (Triethanol Amine), weight %: | 0.8 |
| Viscosity, Centipoise: | 5.0 |
| Chemical Nature: | Anionic with negatively charged colloidal particles |

Triton X305 refers to a nonionic surfactant from Rohm & Hass.

Drew Y250 refers to a defoamer from Drew Chemical Corp.

KR 1450 refers to thickener available from Permuthane Inc.

Tetrabromo Bisphenol A ethylene oxide ether refers to polyoxyethylene(2) 2,2-bis-(3,5,dibromo-4-hydroxyphenyl)propane having a molecular weight of 643 and hydroxyl value=174 mg KOH/g and is available from Emery Industries Inc. as Emery 9353A.

EXAMPLE 1

An isocyanate-terminated prepolymer was prepared from the following charge:

| Ingredient | Parts by Weight (g) |
|---|---|
| 1.6-Hexanediol Carbonate (MW = 1029.4) available from Permuthane; Inc. as KM10-1122 | 317.9 |
| Tetrabromo bisphenol A ethylene oxide ether | 99.3 |
| DMPA | 24.8 |
| Desmodur W | 233 |
| NMP | 225 |
| Stannous Octoate | 0.1 |
| TEA | 20.5 |

The 1,6-hexanediol carbonate, tetrabromo bisphenol A ethylene oxide ether, DMPA. Desmodur W and NMP were charged into a 1 liter 3 neck flask equipped with a thermometer, condenser with drying tube, and stirrer with a 3 inch blade. While stirring the stannous octoate was added and the mixture was slowly heated to 80°–85° C. and maintained at 80°–85° C. for 2 hrs. to form an NCO-terminated prepolymer with an NCO content of 3.70% (theoretical NCO=3.69%). The prepolymer was cooled to 30° C. and then TEA was added and stirred 15 minutes.

While stirring rapidly, 800 parts of the neutralized prepolymer was transferred in 10 minutes into a 3 liter resin flask (equipped with a Cowles type stirring blade) containing 870 parts of 28° C. deionized water, 17.6 parts of Triton X305 in 10 minutes.

49.6 Parts of 20% aqueous hydrazine was prepared and added to the dispersion over a 5 minute period. The resulting aqueous dispersion was allowed to mix for 1.0 hr. The product had the following physical properties:

| | |
|---|---|
| Solid: | 35.1% |
| pH: | 8.64 |
| Viscosity: | 80 cps @ 25° C. |
| Sward hardness: | 16 |
| Film appearance: | clear |
| Tensile strength: | 6045 psi |
| Elongation: | 300% |
| 100% modulus: | 3230 psi |

EXAMPLE 2

An isocyanate-terminated prepolymer was prepared as in Example 1 from the following charge:

| Ingredient | Parts by Weight (g) |
|---|---|
| 1.6 Hexanediol Neopentyl glycol adipate (MW = 894; hydroxyl value = 120 mg of KOH/g; and hexane diol: neopentyl glycol = 67:33) available from RVCO FLEX as S1015-120 | 224.7 |
| Tetrabromo bisphenol A ethylene oxide ether | 87.3 |
| Dimethylolpropionic acid (DMPA) | 33.7 |
| Desmodur W | 329.3 |
| N—methyl-2-pyrrolidone (NMP) | 225 |
| Dibutyltindilaurate | 0.1 |
| Triethylamine (TEA) | 25.4 |

The NCO content of the above prepolymer was 5.54% (theoretical NCO=5.77%) 850 parts of the above neutralized prepolymer was dispersed as in Example 1 into 901.5 parts of 18° C. deionized water containing 36.1 parts of Nyacol A1530 and 2.5 parts of triethylamine in 10 mins. 89.7 parts of 20% aqueous hydrazine was prepared and added to the dispersion over a 5 min. period. The resulting aqueous dispersion was allowed to mix for 1.0 hr. The product had the following properties:

| | |
|---|---|
| Solid: | 34.7% |
| pH: | 7.9 |
| Viscosity: | 150 cps @ 25° C. |
| Sward hardness: | 20 |
| Film appearance: | clear |
| Tensile strength: | 7490 psi |
| Elongation: | 170% |
| 100% modulus: | 6500 psi |

EXAMPLE 3

An isocyanate-terminated prepolymer was prepared as in Example 1 from the following charge:

| Ingredient | Parts by Weight (g) |
| --- | --- |
| 1.6 Hexanediol Neopentyl glycol adipate (MW = 3016) available from RVCO FLEX as S1015-35 | 389.1 |
| Tetrabromo bisphenol A ethylene oxide ether (MW = 643) | 83 |
| Dimethylolpropionic acid | 27.6 |
| Isophorone diisocyanate | 175.3 |
| N—methyl-2-pyrrolidone | 225 |
| Dibutyl tin dilaurate | 0.1 |
| Dimethylethanolamine | 18.3 |

The NCO content of the prepolymer was 2.83% (Theo=3.03%) 800 parts of the above neutralized prepolymer was dispersed as in Example 1 into 849.6 parts of 27° C. deionized water containing 29.2 parts of Nyacol A1530 and 1.8 parts of dimethylethanolamine in 10 minutes. 42 Parts of an 20% aqueous hydrazine was prepared and added to the dispersion over 5 min. The resulting mixture was allowed to mix for 1 hr. The product had the following properties:

| Solid: | 34.6% |
| --- | --- |
| pH: | 8.0 |
| Viscosity: | 80 cps @ 24° C. |
| Sward hardness: | 10 |
| Film appearance: | hazy |
| Tensile strength: | 7390 psi |
| Elongation: | 430% |
| 100% modulus: | 1825 psi |

EXAMPLE 4

An isocyanate-terminated prepolymer was prepared as in Example 1 from the following charge:

| Ingredient | Parts by Weight (g) |
| --- | --- |
| Polytetramethylene glycol (MW = 1996) available from DUPONT as TERACOL-2000 | 249 |
| Polytetramethylene glycol (MW = 995) available from DUPONT as TERACOL-1000 | 91.5 |
| Tetrabromo bisphenol A ethylene oxide ether (MW = 643) | 93 |
| Dimethylolpropionic acid | 29 |
| Desmodur W | 257.4 |
| N—methylpyrrolidone | 180 |
| Dibutyl tin dilaurate | 0.1 |
| Triethylamine | 21.9 |

The NCO content of the prepolymer was 3.43% (Theo 3.77%) 350 parts of the above neutralized prepolymer was dispersed as in Example 1 into 366.5 parts of 13° C. deionized water containing 54.5 parts of Nyacol A1530 and 2.2 part of triethylamine. 22.3 Parts of an 20% aqueous hydrazine was prepared and added to the dispersion over 5 minutes. The resulting dispersion was allowed to mix for 1.0 hr. The product had the following properties:

| Solid: | 36.9% |
| --- | --- |
| pH: | 8.4 |
| Viscosity: | 100 cps @ 27° C. |
| Sward hardness: | 18 |
| Film appearance: | slight hazy |
| Tensile strength: | 7350 psi |
| Elongation: | 450% |
| 100% modulus: | 2230 psi |

EXAMPLE 5

An NCO-terminated prepolymer was prepared as in Example 1 from the following charge:

| Ingredient | Parts by Weight (g) |
| --- | --- |
| Polypropyleneglycolthioether (MW = 3165; hydroxyl value = 33 mg KOH/g; and sulphur content = 29%) (Products Research & Chemicals Corp. Permapol P-855) | 211 |
| Tetrabromo bisphenol A ethylene oxide ether (MW = 643) | 42.9 |
| Dimethylolpropionic acid | 14.3 |
| Desmodur W | 106.9 |
| N—methylpyrrolidone | 125 |
| Stannous Octoate | 0.1 |
| Triethylamine | 11.9 |

The NCO content of the prepolymer was 2.98% (Theo 2.82%). 400 Parts of above neutralized prepolymer was dispersed as in Example 1 into 426.8 parts of 25° C. deionized water in 10 minutes. 22 Parts of 20% aqueous hydrazine was prepared and added to the dispersion over 5 minutes period. The resulting dispersion was allowed to mix for 1.0 hr. The product had the following properties:

| Solid: | 35% |
| --- | --- |
| pH: | 9.7 |
| Viscosity: | 70 cps @ 25° C. |
| Sward hardness: | 10 |
| Film appearance: | clear |

EXAMPLE 6

An isocyanate-terminated prepolymer was prepared as in Example 1 from the following charge:

| Ingredient | Parts by Weight (g) |
| --- | --- |
| Hydroxy-terminated Polydimethylsiloxane-polyoxyethylene copolymer (Dow Corning (Q4-3667) (mw = 1200); hydroxyl value = 47 mg KOH/g; and relative siloxane content = 35% | 222.2 |
| Tetrabromo bisphenol A ethylene oxide ether (MW = 643) | 59.5 |
| Dimethylolpropionic acid | 19.8 |
| Desmodur W | 148.4 |
| N—methylpyrrolidone | 0.1 |
| Triethylamine | 11.0 |

The NCO content of the prepolymer was 2.54% (Theoretical NCO=3.26%). 530 Parts of the above neutralized prepolymer was dispersed as in Example 1 into 976.5 parts of 27° C. deionized water containing 28.1 parts of Nyacol A1530 and 1 part of triethylamine in 10 minutes. 22.7 Parts of an 20% aqueous hydrazine was prepared and added to the dispersion over 5 minutes period. The resulting mixture was allowed to mix for 1.0 hr. The product had the following properties:

| | |
|---|---|
| Solid: | 24.9% |
| pH: | 7.4 |
| Viscosity: | 450 cps @ 25° C. |
| Sward hardness: | 14 |
| Film appearance: | clear with tinted blue |

EXAMPLE 7

An NCO-terminated prepolymer was prepared as in Example 1 from the following charge:

| Ingredient | Parts by Weight (g) |
|---|---|
| Polypropylene glycol (MW = 1002.4) available from OLIN as POLY G 20-112 | 342.4 |
| Tetrabromo bisphenol A ethylene oxide ether (MW = 643) | 109.7 |
| Dimethylolpropionic acid | 45.7 |
| Toluenediisocyanate (80/20) | 267.1 |
| N—methylpyrrolidone | 255.1 |

The NCO content of the prepolymer was 5.28% (Theo 5.62%) 200 parts of above prepolymer was transferred into a liter resin flask equipped with Cosles type stirring blade. While stirring rapidly, a mixture of 221.2 parts 6° C. deionized water and 7.4 parts of TEA was quickly added into resin flask containing prepolymer. One drop of Drew Y250 defoamer was added to control the foaming. The resulting dispersion was allowed to mix for 3.0 hrs. The product had the following properties:

| | |
|---|---|
| Solid: | 34.8% |
| pH: | 8.42 |
| Viscosity: | 100 cps @ 25° C. |
| Sward hardness: | 8 |
| Film appearance: | clear |
| Tensile strength: | 4475 psi |
| Elongation: | 285% |
| 100% modulus: | 2735 psi |

EXAMPLE 8

200 Parts of the NCO-terminated from Example 7 was added into the 1 liter resin flask equipped with Cowles type blade containing 226.2 parts 6° C. deionized water, 6.4 parts of 64% hydrazine, and 7.4 parts TEA in a period of 10 minutes with fast stirring. The resulting dispersion was allowed to mix for 1.0 hr. The product has properties as following:

| | |
|---|---|
| Solid: | 35% |
| pH: | 7.7 |
| Viscosity: | 350 cps @ 25° C. |
| Sward hardness: | 10 |
| Film appearance: | clear |
| Tensile strength: | 4740 psi |
| Elongation: | 180% |
| 100% modulus: | 4055 psi |

EXAMPLE 9

200 Parts of the NCO-terminated prepolymer from Example 7 was added into the 1 liter resin flask equipped with Cowles type stirring blade containing 245.6 parts of 10° C. deionized water, 13 parts of aminoethylethanol amine, and 7.4 parts TEA in a period of 10 minutes with fast agitation. The resulting dispersion was allowed to mix for 1.0 hr. The product has properties as following:

| | |
|---|---|
| Solid: | 35.2% |
| pH: | 8.2 |
| Viscosity: | 20,000 cps @ 25° C. |
| Sward hardness: | 8 |
| Film appearance: | clear |
| Tensile strength: | 4650 psi |
| Elongation: | 250% |
| 100% modulus: | 3310 psi |

EXAMPLE 10

200 Parts of the NCO-terminated prepolymer from Example 7 was added into the 1 liter resin flask equipped with Cowles type blade containing 230.8 parts 10° C. deionized water, 3.6 parts of 64% hydrazine, 1.6 parts of diethylenetriamine, and 7.4 parts TEA in a period of 10 minutes with fast agitation. The resulting dispersion was allowed to mix for 1.0 hr. The product has following properties:

| | |
|---|---|
| Solid: | 34.9% |
| pH: | 8.3 |
| Viscosity: | 200 cps @ 25° C. |
| Sward hardness: | 10 |
| Film appearance: | clear |
| Tensile strength: | 4170 psi |
| Elongation: | 140% |
| Percent modulus: | 3850 psi |

EXAMPLE 11

An isocyanate-terminated prepolymer was prepared as in Example 1 from the following charge:

| Ingredient | Parts by Weight (g) |
|---|---|
| 1.6 Hexanediol Neopentyl glycol adipate (MW = 3016) | 311.4 |
| Dibromoneopentyl glycol | 65.4 |
| Dimethylol propionic acid | 27.7 |
| Desmodur W | 270.5 |
| N—methylpyrrolidone | 225 |
| Stannous Octoate | 0.1 |
| Triethylamine | 23.1 |

The NCO content of the prepolymer was 4.00% (Theoretical=4.43%). 800 Parts of the above neutralized prepolymer was dispersed as in Example 1 into 841.9 parts of 26° C. deionized water containing 29.3 parts of Nyacol A1530 and 2.3 parts of triethylamine in 10 minutes. 59.4 Parts of an 20% aqueous hydrazine was prepared and added to the dispersion over 5 min. The resulting mixture was allowed to mix for 1 hr. The product had the following properties:

| | |
|---|---|
| Solid: | 34.9% |
| pH: | 8.4 |
| Viscosity: | 60 cps @ 25° C. |
| Sward hardness: | 20 |
| Film appearance: | clear |
| Tensile strength: | 6285 psi |
| Elongation: | 370% |
| 100% modulus: | 3170 psi |

EXAMPLE 12

Direct Coating on Nylon

Product from Example 3 was thickened to 10,000 cps with Permuthane KR 1450 thickener and direct coated on Kenyon 3 oz. yellow nylon fabric. The swatches were oven dried 6 min. at 300° F. to have 2½-3 oz. weight pick up and are allowed to condition for 24 hrs. at ambient temperature. A 45° flammability test was used. A 2 inch flame from a propane torch was allowed to impinge for 5 sec. at a 90° angle to the surface of test sample. The time of the after burn was recorded in seconds.

|           | After burn |
|-----------|------------|
| Example 3 | 0 sec.     |

EXAMPLE 13

Non-Support Burn Test

Aqueous urethanes were coated on glass plates with 9 mils wet thickness and oven dried 5 min. at 300° F. and conditioned at ambient temperature for 24 hrs. The films were removed from the glass plate and cut to a specimen size of 4 in. ×10 in. The film was secured with upside down U clamps and held at a 90° angle. A 1½ inch height flame from a propane torch was used to impinge for 12 sec. at a 90° angle to the bottom edge of the test film. The time after burn was recorded in seconds.

| Sample    | After burned (sec) | Burn distance (inch) |
|-----------|--------------------|----------------------|
| Example 1 | 0 sec.             | 3.50                 |
| 2         | 0 sec.             | 4.25                 |
| 3         | 0 sec.             | 4.75                 |
| 4         | 0 sec.             | 4.25                 |
| 5         | 0 sec.             | 5.50                 |
| 7         | 0 sec.             | 4.25                 |
| 8         | 0 sec.             | 6.75                 |
| 9         | 0 sec.             | 4.75                 |
| 10        | 0 sec.             | 4.25                 |

EXAMPLE 14

Product of Example 1 was coated on calendered vinyl, typical of automotive and upholstery fabric, with a No. 12 wire wound meyer rod. The coated piece was cured at 200° F. for one minute and aged at ambient temperature overnight. It was then placed in an air circulation oven at 220° F. for 7 days. It was found to show no color change.

What is claimed is:

1. An aqueous polyurethane dispersion comprising the reaction product of
   (a) a prepolymer of
      a diol selected from the group consisting of alkoxylated halogen containing Bisphenol A diols and halogen containing neopentyl glycols,
      a second diol selected from the group consisting of carboxy group, sulphonate group and tertiary amine containing diols,
      a polyol having a hydroxyl functionality equal to at least 2 wherein said functionality is attached to either (a) a polymer selected from the group consisting of polyesters, polylactones, polyacetals, polycarbonates, polyolefins, polyethers, polythioethers and mixtures or combined polymers thereof having a molecular weight of from about 300 to about 4200, (b) linear or branched hydrocarbon containing from 2 to 20 carbon atoms having a molecular weight up to 300 or (c) combinations of (a) and (b), and
      an organic diisocyanate in an aqueous dispersion, with
   (b) an active hydrogen containing chain extender.

2. A dispersion as claimed in claim 1, wherein the halogen containing diol is a Bisphenol A diol of the formula:

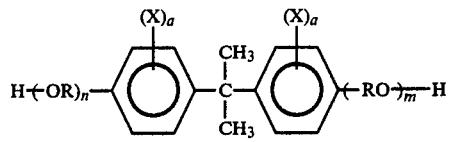

wherein
   X is bromine or chlorine;
   a is an integer from 1 to 4;
   R is an alkylene group containing from 2 to 4 carbon atoms; and
   n and m are integers from 1 to 10.

3. A dispersion, as claimed in claim 1, wherein the halogen containing diol is a neopentyl glycol of the formula:

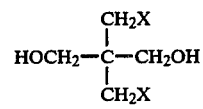

wherein X is bromine or chlorine.

4. A dispersion, as claimed in claim 2, wherein the halogen containing Bisphenol A diol is polyoxyethylene(2) 2,2-bis-(3,5,-dibromo-4-hydroxyphenyl)propane.

5. A dispersion, as claimed in claim 3, wherein the halogen containing neopentyl glycol is dibromoneopentyl glycol.

6. A dispersion, as claimed in claim 1, wherein the second diol is a carboxy group containing diol having the formula

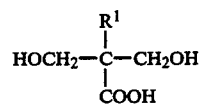

wherein $R^1$ is hydrogen or an alkyl group containing from 1 to 8 carbon atoms.

7. A dispersion, as claimed in claim 6, wherein the second diol is 2,2-dimethylolpropionic acid.

8. A dispersion, as claimed in claim 1, wherein the second diol is a tertiary amine containing diol.

9. A dispersion, as claimed in claim 8, wherein the diol is N-methyldiethanolamine.

10. A dispersion, as claimed in claim 1, wherein the second diol is a sulphonate group containing diol having the formula:

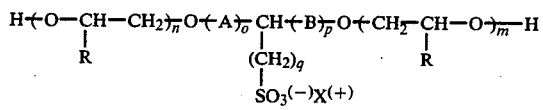

wherein

A and B which may be the same or different, each represents a divalent aliphatic hydrocarbon group containing from 1 to 6 carbon atoms;

R represents hydrogen, an aliphatic hydrocarbon group containing from 1 to 4 carbon atoms or a phenyl group;

$X^{(+)}$ represents an alkali metal cation or an ammonium group which may be substituted;

n and m which may be the same or different, and represents an integer of from 0 to 30;

o and p represent 0 or 1; and q represents an integer of from 0 to 2.

11. A coated article comprising a substrate coated with a urethane comprising the reaction product of
 (a) a prepolymer of
  a halogen-containing diol,
  a second diol selected from the group consisting of carboxy group, sulphonate group and tertiary amine containing diols,
  a polyol having a hydroxyl functionality equal to at least 2 wherein said functionality is attached to either (a) a polymer selected from the group consisting of polyesters, polylactones, polyacetals, polycarbonates, polyolefins, polyethers, polythioethers and mixtures or combined polymers thereof, (b) linear or branched hydrocarbon containing from 2 to 20 carbon atoms having a molecular weight up to 300 or (c) combinations of (a) and (b), and
 an organic diisocyanate, with
 (b) an active hydrogen containing chain extender.

12. A dispersion, as claimed in claim 1, further including antimony oxide.

* * * * *